(12) United States Patent
Spruce et al.

(10) Patent No.: US 10,318,666 B2
(45) Date of Patent: Jun. 11, 2019

(54) SIMULATION OF A MAXIMUM POWER OUTPUT OF A WIND TURBINE

(71) Applicant: VESTAS WIND SYSTEMS A/S, Aarhus N (DK)

(72) Inventors: Chris Spruce, Leatherhead (GB); Kelvin Hales, Surrey (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 588 days.

(21) Appl. No.: 14/908,949

(22) PCT Filed: Jul. 16, 2014

(86) PCT No.: PCT/DK2014/050224
§ 371 (c)(1),
(2) Date: Jan. 29, 2016

(87) PCT Pub. No.: WO2015/014368
PCT Pub. Date: Feb. 5, 2015

(65) Prior Publication Data
US 2016/0196370 A1  Jul. 7, 2016

(30) Foreign Application Priority Data
Jul. 29, 2013  (DK) ................................ 2013 70417

(51) Int. Cl.
G06G 7/48   (2006.01)
G06F 17/50  (2006.01)
F03D 17/00  (2016.01)
F03D 7/02   (2006.01)
(Continued)

(52) U.S. Cl.
CPC ......... *G06F 17/5009* (2013.01); *F03D 7/028* (2013.01); *F03D 7/0292* (2013.01); *F03D 7/048* (2013.01); *F03D 9/25* (2016.05); *F03D 17/00* (2016.05); *F03D 9/255* (2017.02);
(Continued)

(58) Field of Classification Search
None
See application file for complete search history.

(56) References Cited

U.S. PATENT DOCUMENTS 7,638,983 B2 * 12/2009 Park .................... H02M 5/4585
290/44
8,380,357 B2 *  2/2013 Garcia Barace ...... F03D 7/0224
290/44
(Continued)

FOREIGN PATENT DOCUMENTS

CN  102454544 A  5/2012
CN  102622458 A  8/2012
(Continued)

OTHER PUBLICATIONS

European Search Report for Application 17187025.6-1607 dated Dec. 19, 2017.
(Continued)

*Primary Examiner* — Aniss Chad
*Assistant Examiner* — Nithya J. Moll
(74) *Attorney, Agent, or Firm* — Patterson + Sheridan, LLP

(57) ABSTRACT

The present invention relates to determining and setting wind turbine type maximum power level (301) and individual wind turbine maximum power level (308) for over-rating control.

20 Claims, 3 Drawing Sheets

(51) Int. Cl.
*F03D 7/04* (2006.01)
*F03D 9/25* (2016.01)

(52) U.S. Cl.
CPC ..... *F05B 2260/84* (2013.01); *F05B 2270/332* (2013.01); *Y02E 10/723* (2013.01)

(56) References Cited

U.S. PATENT DOCUMENTS

| | | | | |
|---|---|---|---|---|
| 8,649,911 | B2* | 2/2014 | Avagliano | F03D 7/028 290/44 |
| 9,018,782 | B2* | 4/2015 | Couchman | F03D 7/028 290/44 |
| 2002/0079706 | A1* | 6/2002 | Rebsdorf | H02P 9/007 290/55 |
| 2003/0127862 | A1 | 7/2003 | Weitkamp | |
| 2004/0119292 | A1 | 6/2004 | Datta et al. | |
| 2011/0006528 | A1 | 1/2011 | Engelhardt et al. | |

FOREIGN PATENT DOCUMENTS

| | | |
|---|---|---|
| EP | 1930855 A2 | 6/2008 |
| EP | 2108830 A2 | 10/2009 |
| EP | 2302208 A1 | 3/2011 |
| EP | 2444659 A1 | 4/2012 |
| EP | 2482053 A1 | 8/2012 |
| KR | 20080028605 A | 4/2008 |
| WO | 2011095519 A2 | 8/2011 |
| WO | 2012041326 A2 | 4/2012 |
| WO | 2012129721 A1 | 10/2012 |
| WO | 2013032077 A1 | 3/2013 |

OTHER PUBLICATIONS

International Search Report for PCT/DK2014/050224, dated Oct. 14, 2014.
Danish Search Report for PA 2013 70417, dated Mar. 14, 2014.
SIPO of the People's Republic of China Notification of the First Office Action dated Dec. 27, 2017 for Application No. 201480053651.5.

* cited by examiner

SIMULATION OF A MAXIMUM POWER OUTPUT OF A WIND TURBINE

The present invention relates to Maximum Power Levels for wind turbines and, in particular, to setting a Wind Turbine Type Maximum Power Level and an Individual Wind Turbine Maximum Power Level for over-rating control.

Wind turbines generate electricity by converting kinetic energy from wind into electrical energy via a generator. The amount of electrical energy generated by a wind turbine is typically determined by the nominal power rating or rated power level of the wind turbine and the wind conditions at the site where the wind turbine is located (e.g. terrain, wind speeds, etc.). Often multiple wind turbines are co-located in a wind power plant in order to generate a sufficient electrical energy to supply to a grid.

The Annual Energy Production (AEP) of a wind power plant relates to the productivity of the wind turbines forming the wind power plant and typically is dependent on the annual wind speeds at the location of the wind power plant. The greater the AEP for a given wind power plant the greater the profit for the operator of the wind power plant and the greater the amount of electrical energy supplied to the grid.

Thus, wind turbine manufacturers and wind power plant operators are constantly attempting to increase the AEP for a given wind power plant.

One such method may be to over-rate the wind turbines under certain conditions, in other words, allow the wind turbines to operate up to a power level that is above the rated or name-plate power level of the wind turbines for a period of time, in order to generate more electrical energy when winds are high and accordingly increase the AEP of a wind power plant.

However, there are several problems and drawbacks associated with over-rating wind turbines. Wind turbines are typically designed to operate at a given nominal rated power level or name-plate power level and to operate for a given number of years, e.g. 20 years. Therefore, if the wind turbine is over-rated then the lifetime of the wind turbine may be reduced.

The present invention seeks to address, at least in part, some or all of the problems and drawbacks described hereinabove.

According to a first aspect of the present invention there is provided a method for setting a Wind Turbine Type Maximum Power Level for a type of wind turbine comprising: simulating a load spectrum for two or more test power levels to determine a load on the type of wind turbine for each of the two or more test power levels; comparing the determined load for each test power level with a design load for the type of wind turbine; and setting the wind turbine type maximum power level for the type of wind turbine as the maximum test power level at which the determined load does not exceed the design load for the type of wind turbine.

Accordingly, a Wind Turbine Type Maximum Power Level can be determined for one or more types of wind turbine.

A type of wind turbine may be understood as a wind turbine with the same electrical system, mechanical system, generator, gearbox, turbine blade, turbine blade length, hub height, and so on. Accordingly, any difference to the main structure or components of a wind turbine may effectively generate a new type of wind turbine. For example, the same wind turbine except for different hub heights (e.g. tower heights) may be considered two different types of wind turbine. Similarly, the same wind turbine except of different turbine blade lengths may also be considered two different types of wind turbine. Also, a 50 Hz and 60 Hz wind turbine may be considered different types of wind turbine, as are cold climate and hot climate designed wind turbines.

The type of wind turbine therefore does not necessarily correspond to the Electrotechnical Commission (IEC) class of wind turbine as different types of turbine may be in the same IEC class of wind turbine where each type of wind turbine may have a different wind turbine type maximum power level based on the design of and components in the wind turbine.

The wind turbine type maximum power level may be determined by comparing the expected loads for a given power level with the design loads for that the given type of wind turbine and identifying the largest power level which does not cause loads on the wind turbine that exceed the design loads. The loads may be the mechanical loads, fatigue loads or any other loads that may be determined for a wind turbine at a given power level.

Determining the load on the type of wind turbine may include determining the load for one or more mechanical components of the type of wind turbine. The loads may be determined for all the mechanical components in the type of wind turbine or for one or more of the main or critical mechanical components.

The method may further comprise setting a first test power level, wherein the first test power level is greater than a nominal name-plate power level for the type of wind turbine by a first predetermined value; and incrementing each subsequent test power level by a second predetermined value. The first test power level may be initially set at a value higher than the nominal name-plate rating, e.g. 5 KW, 10 KW, 15 KW, 20 KW, 30 KW, 50 KW, and so on, or by a percentage of the nominal name-plate rating, e.g. 1%, 2%, 5%, and so on. The incremental steps may be any suitable for the purpose of identifying the wind turbine type maximum power level, e.g. 5 KW, 10 KW, 15 KW, 20 KW, 30 KW, 50 KW, and so on, or increase by a percentage of the test power level, e.g. 1% increments, 2% increments, 5% increments, and so on.

The method may further comprise setting a first test power level, wherein the first test power level is greater than a nominal name-plate power level for the type of wind turbine by a third predetermined value; and decrementing each subsequent test power level by a fourth predetermined value. Therefore, the first test power level may be initially set at a value substantially higher than the nominal name-plate rating, e.g. 500 KW, 400 KW, 300 KW, 200 KW, 100 KW, 50 KW, and so on, or by a percentage of the nominal name-plate rating, e.g. 20%, 15%, 10%, and so on. The decremented steps may be any suitable for the purpose of identifying the wind turbine type maximum power level, e.g. 5 KW, 10 KW, 15 KW, 20 KW, 30 KW, 50 KW, and so on, or decrease by a percentage of the test power level, e.g. 1% increments, 2% increments, 5% increments, and so on.

The step of simulating the load spectrum for the two or more test power levels may be performed simultaneously, or may be performed for each of the two or more test power levels in turn.

The step of comparing the determined load for each of the two or more test power levels with the design loads for the type of wind turbine may be performed simultaneously, or may be performed for each of the two or more test power levels in turn.

If the determined load exceeds the design load, then the method may further comprise identifying one or more of the mechanical components for which the determined load exceeded the design load of the one or more mechanical components; and analyzing the one or more mechanical components to identify whether the design load for the one or more mechanical components can be increased. There may be incorporated into the design of the given type of wind turbine allowances or safety margins that may be analyzed to see if they were conservative and therefore the design limits of the mechanical components could be increased.

If the determined load exceeds the design load, the method may further comprise identifying one or more of the mechanical components for which the determined load exceeded the design load of the one or more mechanical components; identifying control and/or hardware to enable the one or more mechanical components to operate at a load greater than the design load for the one or more mechanical components; and implementing the identified control and/or hardware in the type of wind turbine. Therefore, it may be that the design limits of one or more mechanical components could be increased by adding additional hardware/control software to the wind turbine. For example, the control software could include additional thresholds that could prevent over-rating under certain conditions which would mean that for at least a period of time the mechanical component could operate at higher that its design limits. Hardware could include adding temperature sensors to the mechanical component to measure the temperature and enable the mechanical component to operate at higher than its design limitations whilst the temperature is below a threshold. As will be appreciated, there may be several different control and/or hardware or a combination of the two which may enable the mechanical components to operate at a power level greater than the design limits for the mechanical components.

The method may further comprise determining for the wind turbine type maximum power level whether one or more electrical components of the type of wind turbine are within design limits. The main electrical components may include, for example, the generator, transformer, internal cables, contactors, or any other electrical component in the type of wind turbine. Based on simulations and/or calculations it may be determined whether the main electrical components can operate at the previously determined wind turbine type maximum power level.

If the design limits for one or more electrical components are exceeded at the wind turbine type maximum power level, the method may further comprise checking the determination for conservatism to identify whether the design limits for the one or more electrical components can be increased such that for the wind turbine type maximum power level the one or more electrical components are within the increased design limits. The design of the electrical components may have incorporated conservatism, allowances or safety margins which may be analyzed to check whether the design limits for the electrical components can be increased whilst still being able to operate safely. As over-rating may only be performed at certain times and/or under certain conditions then the electrical components may be able to operate at a higher power level for a certain period of time enabling the design limits for the purpose of over-rating to be increased.

If the design limits for one or more electrical components are exceeded at the wind turbine type maximum power level, the method may further comprise identifying control and/or hardware to enable the one or more electrical components to operate at the wind turbine type maximum power level; and implementing the identified control and/or hardware in the type of wind turbine. For example, if the temperature of the electrical component is key to its design limit then additional temperature sensors could be implemented in the wind turbine to ensure that the temperature does not exceed its maximum whilst the wind turbine may be over-rated. Similarly, additional control in terms of implementing additional thresholds may be included, for example, to cancel or prevent over-rating if the temperature increases to above a threshold, which may therefore enable the electrical component to operate above its design limit for at least a period of time. As will be appreciated, there may be any suitable hardware, control software or any combination of the two that may be implemented to enable one or more electrical components to operate at a higher power level than the design limit, for at least a period of time for over-rating.

If the design limits for one or more electrical components are exceeded at the wind turbine type maximum power level, the method may further comprise decrementing the wind turbine type maximum power level by fifth predetermined value; determining for the decremented wind turbine type maximum power level whether one or more electrical components of the type of wind turbine are within the design limits; and setting the wind turbine type maximum power level at a first decremented wind turbine type maximum power level for which the one or more electrical components of the type of wind turbine are within the design limits.

Therefore, if there is no room for increasing the design limit of one or more electrical components then a lower wind turbine type maximum power level may be determined by decrementing the wind turbine type maximum power level by a predetermined value and then determining whether the electrical components can operate within design limits at the decremented level. The predetermined value that the wind turbine type maximum power level may be decremented by may be any suitable for the purpose of identifying the wind turbine type maximum power level, e.g. 5 KW, 10 KW, 15 KW, 20 KW, 30 KW, 50 KW, and so on, or by a percentage, e.g. 1%, 2%, 5%, and so on.

The method may further comprise determining an individual maximum power level for one or more wind turbines based on the wind turbine type maximum power level, wherein the individual maximum power level is used in over-rating control of the one or more wind turbines. Accordingly, the determined wind turbine type maximum power level may then be used to determine an individual maximum power level for a given wind turbine of the type of wind turbine.

The wind turbine type maximum power level may be set for one or more wind turbine types.

The method may further comprise applying a conservatism factor to the wind turbine type maximum power level. Therefore, to incorporate a safety margin for the wind turbine a conservatism factor may be included, e.g. to reduce the wind turbine type maximum power level by, e.g. 5 KW, 10 KW, 15 KW, 20 KW, 30 KW, 50 KW, and so on, or by a percentage, e.g. 1%, 2%, 5%, and so on.

The wind turbine type maximum power level may include, or define, one or more of a maximum generator torque, a maximum generator current, maximum generator speed, and maximum rotor speed.

According to a second aspect of the present invention there is provided an apparatus for setting a Wind Turbine Type Maximum Power Level for a type of wind turbine comprising a first processor adapted to simulate a load spectrum for two or more test power levels to determine a load on the type of wind turbine for each of the one or more test power levels; a second processor adapted to compare the determined load for each test power level with a design load for the type of wind turbine; and a third processor adapted to set the wind turbine type maximum power level for the type of wind turbine as the maximum test power level at which the determined load does not exceed the design load for the type of wind turbine.

According to a third aspect of the present invention there is provided an apparatus for setting a Wind Turbine Type Maximum Power Level for a type of wind turbine wherein the apparatus is adapted or configured to simulate a load spectrum for two or more test power levels to determine a load on the type of wind turbine for each of the two or more test power levels; compare the determined load for each test power level with a design load for the type of wind turbine; and set the wind turbine type maximum power level for the type of wind turbine as the maximum test power level at which the determined load does not exceed the design load for the type of wind turbine.

The first processor may be further adapted to determine the load for one or more mechanical components of the type of wind turbine.

The apparatus further comprise a fourth processor adapted to set a first test power level, wherein the first test power level may be greater than a nominal name-plate power level for the type of wind turbine by a first predetermined value; and the fourth processor may further adapted to increment each subsequent test power level by a second predetermined value.

The apparatus may further comprise a fifth processor adapted to set a first test power level, wherein the first test power level may be greater than a nominal name-plate power level for the type of wind turbine by a third predetermined value; and the fifth processor may be further adapted to decrement each subsequent test power level by a fourth predetermined value.

The first processor may be adapted to simulate the load spectrum for the two or more test power levels simultaneously, or may be adapted to simulate the load spectrum for each of the two or more test power levels in turn.

The second processor may be adapted to compare the determined load for each of the two or more test power levels with the design loads for the type of wind turbine simultaneously, or may be adapted to compare the determined load for each of the two or more test power levels with the design loads for the type of wind turbine in turn.

The apparatus may further comprise a sixth processor adapted to identify one or more of the mechanical components for which the determined load exceeded the design load of the one or more mechanical components; and analyze the one or more mechanical components to identify whether the design load for the one or more mechanical components can be increased.

The apparatus may further comprise an eighth processor adapted to identify one or more of the mechanical components for which the determined load exceeded the design load of the one or more mechanical components; and identify control and/or hardware to enable the one or more mechanical components to operate at a load greater than the design load for the one or more mechanical components.

The apparatus may further comprise a ninth processor adapted to determine for the wind turbine type maximum power level whether one or more electrical components of the type of wind turbine are within design limits.

If the ninth processor determines the design limits for one or more electrical components are exceeded at the wind turbine type maximum power level, then the ninth processor may be further adapted to check the determination for conservatism to identify whether the design limits for the one or more electrical components can be increased such that for the wind turbine type maximum power level the one or more electrical components are within the increased design limits.

If the ninth processor determines the design limits for one or more electrical components are exceeded at the wind turbine type maximum power level, then the ninth processor may be further adapted to identify control and/or hardware to enable the one or more electrical components to operate at the wind turbine type maximum power level; such that the identified control and/or hardware can be implemented in the type of wind turbine.

If the ninth processor determines the design limits for one or more electrical components are exceeded at the wind turbine type maximum power level, then the ninth processor may be further adapted to decrement the wind turbine type maximum power level by fifth predetermined value; determine for the decremented wind turbine type maximum power level whether one or more electrical components of the type of wind turbine are within the design limits; and set the wind turbine type maximum power level at a first decremented wind turbine type maximum power level for which the one or more electrical components of the type of wind turbine are within the design limits.

The apparatus may further comprise a tenth processor adapted to determine an individual maximum power level for one or more wind turbines based on the wind turbine type maximum power level, wherein the individual maximum power level may be used in over-rating control of the one or more wind turbines.

The wind turbine type maximum power level may be set for one or more wind turbine types.

The apparatus may further comprise an eleventh processor adapted to apply a conservatism factor to the wind turbine type maximum power level.

The wind turbine type maximum power level may include, or define, one or more of a maximum generator torque, a maximum generator current, maximum generator speed, and maximum rotor speed.

The first processor through eleventh processor may be the same processor, different processors, or any combination thereof. The processor may include or be any one or more of a controller, memory, inputs, outputs, and so on, to enable the processor to perform the necessary functions or features of the aspect of the invention.

The apparatus may be adapted, or configured, to perform the functions and features of the aspect of the invention by hardware, software, or any combination thereof.

According to a fourth aspect of the present invention there is provided a computer program product comprising computer readable executable code for implementing any one or all of the functions and feature of the aspect of the present invention.

According to a fifth aspect of the present invention there is provided a method for determining an individual maximum power level for one or more wind turbines in a wind power plant, comprising: storing a wind turbine type maximum power level for one or more types of wind turbine; storing one or more fatigue load values relating to a range of power levels for each of the one or more types of wind turbine; storing one or more parameters relating to site conditions for the site at which the wind power plant is located; and determining for each wind turbine of a type of wind turbine, based on at least the stored fatigue load levels for the type of wind turbine and the stored parameters relating to the site conditions, the individual maximum power level.

Accordingly, based on the wind turbine type maximum power level, fatigue load levels and site conditions, an individual maximum power level can be determined and set for each individual wind turbine in a Wind Power Plant. This advantageously enables each wind turbine to operate and/or over-rate to its maximum potential at its location in a Wind Power Plant which may increase the Annual Energy Production of the individual wind turbine and/or the Wind Power Plant.

Determining the individual maximum power level for each wind turbine of one type of wind turbine may further comprise determining for a test power level, wherein the test power level is initially set at the wind turbine type maximum power level for the type of wind turbine, whether each wind turbine can operate at the test power level based on the fatigue load values and the parameters relating to the site conditions at a location of each wind turbine; if the determination is positive for one or more wind turbines then setting the one or more wind turbines with an individual maximum power level equal to the test power level; if the determination is negative for one or more wind turbines then generating a subsequent test power level by decrementing the test power level by a predetermined value; and iteratively performing the determination for each subsequent test power levels until the individual maximum power level is set for each wind turbine.

Therefore, the power levels starting at the wind turbine type maximum power level can be checked for each individual wind turbine of that type of wind turbine to determine or identify, based on the conditions at each individual wind turbine the maximum power level that the individual wind turbine may be over-rated to. The wind turbines may be over-rated to any power level up to the maximum possible power level for each wind turbine which may increase the effectiveness and annual energy production of the individual wind turbine.

The method may further comprise determining the fatigue load values for each power level in the range of power levels by simulating one or more load cases across a range of wind speeds and conditions.

The method may further comprise determining the one or more wind turbines have been in operation; storing data relating to the one or more wind turbines historical operation; and altering the fatigue load values based on the data relating to the one or more wind turbines historical operation.

If a wind turbine has been in operation then it may have used up effective lifetime of the wind turbine meaning that it cannot be over-rated to a higher power level that it could have been. Similarly, if the wind turbine has been operating below capacity then there may be spare capacity to over-rate to a higher power level.

The method may further comprise setting the individual maximum power level in the corresponding individual wind turbine.

The method may further comprise setting a lowest determined individual maximum power level in one or more individual wind turbines.

The individual maximum power level may include, or define, one or more of an individual maximum generator torque, an individual maximum generator current, an individual maximum generator speed, and an individual maximum rotor speed.

According to a sixth aspect of the present invention there is provided an apparatus for determining an individual maximum power level for one or more wind turbines in a wind power plant, comprising: a memory adapted to store a wind turbine type maximum power level for one or more types of wind turbine; the memory is further adapted to store one or more fatigue load values relating to a range of power levels for each of the one or more types of wind turbine; the memory is further adapted to store one or more parameters relating to site conditions for the site at which the wind power plant is located; and a first processor adapted to determine for each wind turbine of a type of wind turbine, based on at least the stored fatigue load levels for the type of wind turbine and the stored parameters relating to the site conditions, the individual maximum power level.

According to a seventh aspect of the present invention there is provided an apparatus adapted to, or configured to, store a wind turbine type maximum power level for one or more types of wind turbine; store one or more fatigue load values relating to a range of power levels for each of the one or more types of wind turbine; store one or more parameters relating to site conditions for the site at which the wind power plant is located; and determine for each wind turbine of a type of wind turbine, based on at least the stored fatigue load levels for the type of wind turbine and the stored parameters relating to the site conditions, the individual maximum power level.

The first processor may be further adapted to determine for a test power level, wherein the test power level is initially set at the wind turbine type maximum power level for the type of wind turbine, whether each wind turbine can operate at the test power level based on the fatigue load values and the parameters relating to the site conditions at a location of each wind turbine; if the determination by the first processor is positive for one or more wind turbines then a second processor is adapted to set the one or more wind turbines with an individual maximum power level equal to the test power level; if the determination by the first processor is negative for one or more wind turbines then the first processor is further adapted to generate a subsequent test power level by decrementing the test power level by a predetermined value; and the first processor is further adapted to iteratively perform the determination for each subsequent test power levels until the individual maximum power level is set for each wind turbine.

The apparatus may further comprise a third processor adapted to determine the fatigue load values for each power level in the range of power levels by simulating one or more load cases across a range of wind speeds and conditions.

The apparatus may further comprise a fourth processor adapted to determine the one or more wind turbines have been in operation; the memory being further adapted to store data relating to the one or more wind turbines historical operation; and a fifth processor adapted to alter the fatigue load values based on the data relating to the one or more wind turbines historical operation.

The apparatus may further comprise a sixth processor adapted to set the individual maximum power level in the corresponding individual wind turbine.

The apparatus may further comprise a seventh processor adapted to set a lowest determined individual maximum power level in one or more individual wind turbines.

The individual maximum power level may include, or define, one or more of an individual maximum generator torque, an individual maximum generator current, an individual maximum generator speed, and an individual maximum rotor speed.

The first processor through seventh processor may be the same processor, different processors, or any combination thereof. The processors may include one or more of controllers, memory, inputs, outputs, and so on, to enable the processors to perform the functions and features of the aspect of the invention.

The apparatus may be adapted, or configured, by hardware, software, or any combination thereof.

According to an eighth aspect of the present invention there is provided a computer program product comprising computer readable executable code for implementing one or more of the functions or features of the aspect of the present invention.

According to a ninth aspect of the present invention there is provided a method comprising: simulating a load spectrum for two or more test power levels to determine a load on a type of wind turbine for each of the two or more test power levels; comparing the determined load for each test power level with a design load for the type of wind turbine; setting a wind turbine type maximum power level for the type of wind turbine as the maximum test power level at which the determined load does not exceed the design load for the type of wind turbine; storing one or more fatigue load values relating to a range of power levels for the type of wind turbine; storing one or more parameters relating to site conditions for the site at which a wind power plant is located; and determining for each wind turbine of the type of wind turbine at the wind power plant, based on at least the stored fatigue load levels for the type of wind turbine and the stored parameters relating to the site conditions, an individual maximum power level.

The functions and features of the various aspects and embodiments of the present invention may be separate or combined in any manner to enable the present invention to be implemented and performed.

Embodiments of the present invention will now be described, by way of example only, and with reference to the accompanying drawings, in which.

Figure 1:
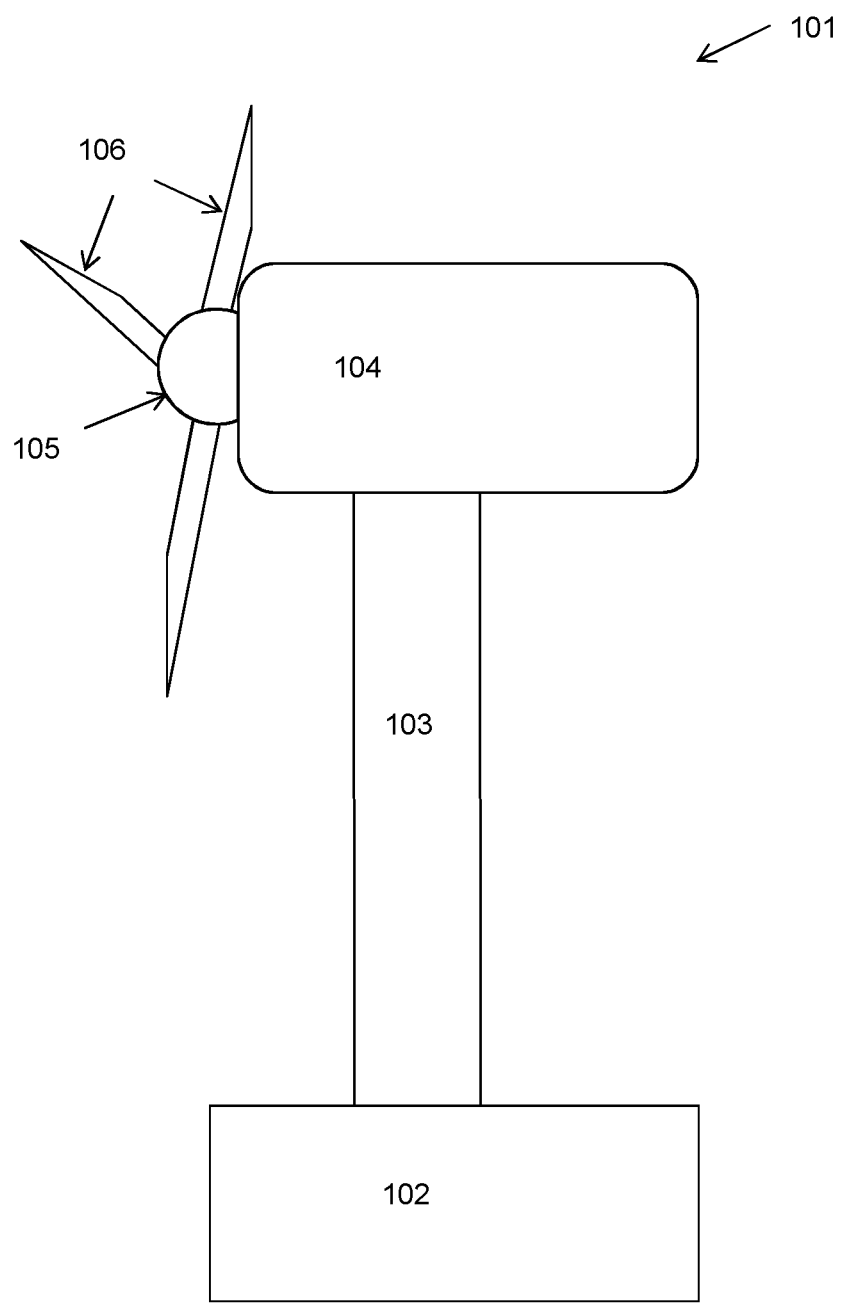
FIG. 1 shows a schematic view of a wind turbine according to many of the embodiments of the present invention.

With reference to FIG. 1, a wind turbine 101 typically includes foundations 102 to which a tower 103 is attached, in order for the tower 103 to be securely and stably maintained at its location. In the example wind turbine 101 shown in FIG. 1, the wind turbine 101 is located onshore and as such the foundations 102 are typically concrete foundations to secure the wind turbine 101 to the Earth.

However, as will be appreciated, the foundations 102 may be any suitable foundations to securely and stably maintain the wind turbine 101 at its location. The foundations may therefore include a platform, a floating platform for offshore wind turbines, anchor cables, and so on.

On top of the tower 103 is located a nacelle 104, where the nacelle typically houses many electrical systems, mechanical systems, and hydraulic systems (not shown for ease of illustration) to control the wind turbine 101 and enable the generation of electrical energy.

A hub 105 is connected to the nacelle 104. The hub 105 is typically attached to a drive shaft (not shown for ease of illustration) which drives a generator (not shown for ease of illustration) in the nacelle 104 to generate electrical energy.

Attached to the hub 105 is a number of turbine blades 106, which rotate under the influence of the impacting wind to rotate the drive shaft that is connected to the generator. In the example shown in FIG. 1, the wind turbine 101 comprises three turbine blades 106 but, as will be appreciated, there may be any number of turbine blades suitable for the purpose of the wind turbine 101. Furthermore, the wind turbine 101 example shown in FIG. 1 is a Horizontal Axis Wind Turbine, but as will be appreciated, the wind turbine 101 may be a Vertical Axis Wind Turbine.

Figure 2:
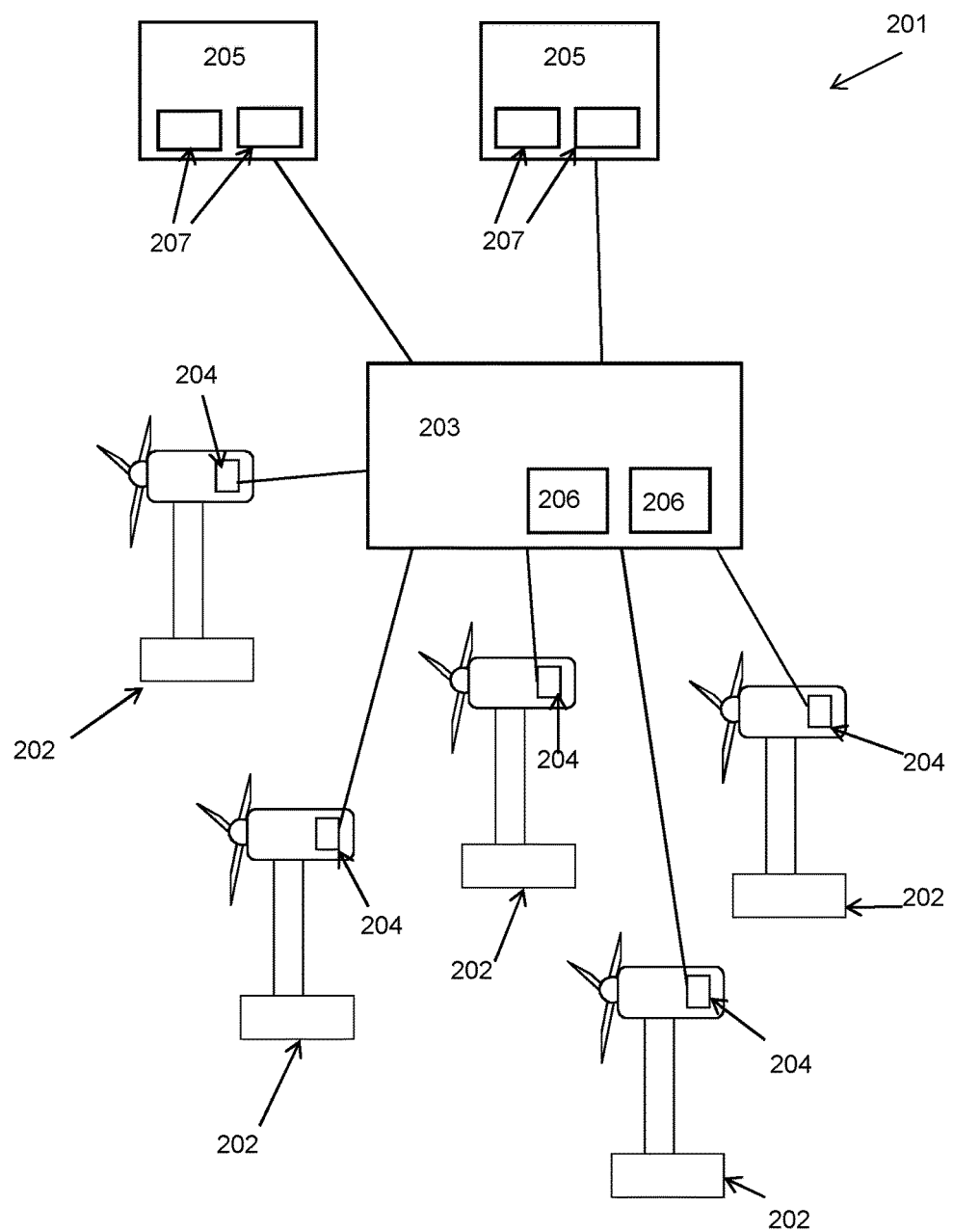
FIG. 2 shows a schematic view of a wind power plant according to many of the embodiments of the present invention.

With reference to FIG. 2, a schematic of a Wind Power Plant (WPP) 201 is shown comprising five wind turbines 202. As will be appreciated, there may be any number of wind turbines 202 in a WPP 201 depending on the required amount of electrical energy, the size of the location of the WPP 201, and so on. There may be tens, hundreds or even thousands of wind turbines 202 that may form a WPP 201.

The wind turbines 202 are typically operatively connected to a Wind Power Plant Controller (WPPC) 203. The WPPC 203 typically controls the WPP, for example, the WPPC may selectively command individual wind turbines to reduce their production of electricity, or cease production completely, to regulate the total amount of electricity being generated by the WPP. Each wind turbine 202 typically comprises a wind turbine controller (or suite of controllers) to control the operation of the wind turbine 202, and the WPPC 203 typically co-operates with wind turbine controllers 204 to manage and control the WPP 201.

The WPPC 203 may be co-located with the wind turbines 202 at the WPP 201 or may be located externally to the WPP 201. The WPPC 203 may include a single controller/processor 206 to implement the functionality of the WPPC, or may include two or more controllers/processors 206 that co-operate to implement the functionality if the WPPC 203.

There may be further control systems and/or computer systems 205, which may be associated with the WPP 201 or utilized to control the WPP 201, plan and/or commission the WPP 201, or provide any suitable support to the operation of the WPP 201. The further control systems and computer systems 205 may include one or more controllers/processors 207 for implementing the functionality of the further control systems and/or computer systems 205

Figure 3:
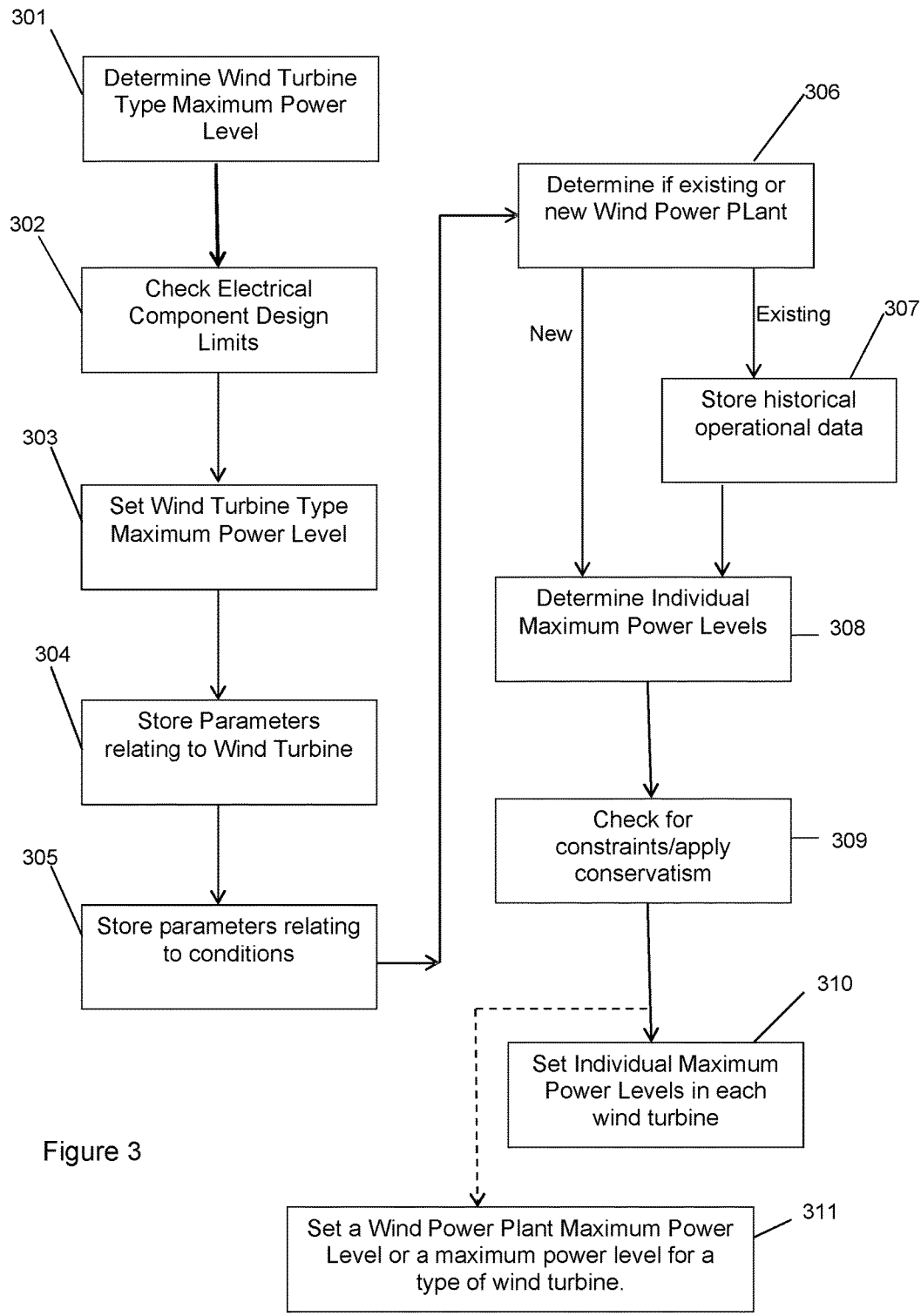
FIG. 3 show a flow diagram according to many of the embodiments of the present invention.

With reference to FIG. 3, which shows a flow chart, the control of over-rating according to many embodiments will be described.

In step 301, a wind turbine type maximum power level for one or more types of wind turbines is determined. In this example, an offline computer system is utilized to determine the wind turbine type maximum power level. However, as will be appreciated, the functionality to determine the wind turbine type maximum power level may be implemented by an online computer system, or any other software and/or hardware associated with wind turbines and/or WPP.

The wind turbine type maximum power level is the maximum power level that a given type of wind turbine is allowed to produce when the wind is suitably high if it is to be operated at the limit of the design loads of the components of the wind turbine. The wind turbine type maximum power level effectively applies for the design lifetime of the turbine. Therefore, the wind turbine type maximum power level will typically be higher than the nominal name-plate rating for that type of wind turbine as the nominal name-plate rating is typically a more conservative value.

A type of wind turbine, as used in the following examples and embodiments, may be understood as a wind turbine with the same electrical system, mechanical system, generator, gearbox, turbine blade, turbine blade length, hub height, and so on. Accordingly, any difference to the main structure or components of a wind turbine effectively generates a new type of wind turbine, for the purpose of the embodiments of the present invention. For example, the same wind turbine except for different hub heights (e.g. tower heights) would be two different types of wind turbine. Similarly, the same wind turbine except of different turbine blade lengths would also be considered two different types of wind turbine. Also, a 50 Hz and 60 Hz wind turbine are considered different types of wind turbine, as are cold climate and hot climate designed wind turbines.

The type of wind turbine therefore does not necessarily correspond to the Electrotechnical Commission (IEC) class of wind turbine as different types of turbine may be in the same IEC class of wind turbine where each type of wind turbine may have a different wind turbine type maximum power level based on the design of and components in the wind turbine.

In the following example, the wind turbine is rated at a nominal plate rating power level of 1.65 MW (1650 KW), with a hub height of 78 meters and designed for service in the conditions of a specific IEC Wind Class.

The wind turbine type maximum power level may then be determined for this type of wind turbine by simulating a load spectrum for a first test over-rate power level to identify the loads on the type of wind turbine for that first power level. The loads may be mechanical loads, fatigue loads, any other loads that may be experienced by the wind turbine, or any combination of the different loads. In this example, the mechanical loads are considered however, as will be appreciated, other loads, e.g. fatigue loads could also be taken into account. The process of simulating the load spectrum may also include or be an extrapolation or other form of analysis that may be performed to determine the load on the type of wind turbine.

A load spectrum typically includes a range of different test cases which may be run in a computer simulation of a wind turbine. For example, the load spectrum may include test cases for winds at 8 m/s for duration of 10 minutes, for 10 m/s for 10 minutes, for different wind directions, for different wind turbulences, for startup of the wind turbine, for shutdown of the wind turbine, and so on. As will be appreciated, there are many different wind speeds, wind conditions, wind turbine operating conditions, and/or fault conditions for which there are test cases to be run in the wind turbine simulation of the load spectrum. The test cases may include real, actual data or artificial data (e.g. for 50 year gusts that are defined in the standards relating to wind turbines). The simulation of the load spectrum may determine the forces and loads affecting the wind turbine for all test cases in the load spectrum. This simulation may also estimate or determine the number of times that the test case event may occur, for example, a test case of 10 m/s wind for a duration of 10 minutes may be expected to occur 2000 times during the 20 year lifetime of the wind turbine and therefore the fatigue on the wind turbine for the lifetime of the wind turbine can be calculated. The simulation may also calculate or determine the fatigue damage or load that could be incurred by the various components in the wind turbine based on the determined loads affecting the wind turbine.

In this example, the first test power level may be 1700 KW as this is higher than the nominal name-plate rating power level for the type of wind turbine being considered in this example. The load spectrum may then be simulated for the given type of wind turbine in order to determine whether the type of wind turbine can operate at that first test power level without exceeding the ultimate design loads of the mechanical components of the type of wind turbine. If the simulation identifies that the type of wind turbine can operate at the first test power level then the same process may be repeated for a second test power level. For example, the second test power level, in this example, may be 1725 KW. The load spectrum is then simulated for the given type of wind turbine to identify whether that type of wind turbine can operate at that second test power level without exceeding the ultimate design loads of the mechanical components.

If the ultimate design loads of the mechanical components are not exceeded then the process of simulating the load spectrum for further test power levels can be iteratively performed. In this example, the test power levels are incremented at steps of 25 KW however, as will be appreciated, the incremental steps may be any suitable for the purpose of identifying the wind turbine type maximum power level, e.g. 5 KW, 10 KW, 15 KW, 20 KW, 30 KW, 50 KW, and so on, or increase by a percentage of the test power level, e.g. 1% increments, 2% increments, 5% increments, and so on. Alternatively, the process start at a high first test power level and for each iteration decrements the test power level by a suitable amount until the wind turbine type maximum power level is identified, i.e. the first test power level at which the type of wind turbine can operate without exceeding ultimate design limitations.

In this example, the given type of wind turbine is identified as being able to operate at further test power levels of 1750 KW, 1775 KW and 1800 KW before a design limitation of one or more mechanical components is exceeded at 1825 KW.

Thus, the process identifies that the wind turbine type maximum power level for this type of turbine is 1800 KW.

In further embodiments, as the type of wind turbine did not exceed the ultimate design loads for the mechanical components at 1800 KW but did exceed the ultimate design loads for the mechanical components at 1825 KW then the process could further iteratively increment the test power levels by smaller increments, e.g. 5 KW to identify whether the wind turbine could operate without exceeding the mechanical ultimate design loads at a power level between 1800 KW and 1825 KW. However, in the current example, the power level of 1800 KW is taken as the wind turbine type maximum power level for this type of wind turbine.

In further embodiments, additional analysis could be performed once a test power level is reached at which the type of wind turbine exceeds the ultimate design loads of one or more of the mechanical components. For example, if the mechanical component for which the ultimate design load was exceeded at a given test power level is, e.g. a gearbox, then an analysis of the mechanical component, e.g. gearbox, could be performed. For example, if the gearbox ultimate torque exceeded the design limitations then an analysis could be performed on the specific components of the gearbox to identify the weak spots. The weak spots in this case may be, e.g. the casing and the torque arms, and therefore by analyzing those weak spots it may be identified that the increased loads at the test power level would not in fact increase the loads on the weak spots beyond the ultimate design load of the components in the identified weak spots, due to the safety factors present in those components. Therefore, after analyzing the components of the gearbox it may be identified that in fact the gearbox could operate at the given test power level. Additionally, Finite Element (FE) analysis could also be performed on the one or more components that exceeded the ultimate design loads.

In further embodiments, once the wind turbine type maximum power level for a given type of wind turbine has been determined it may be suitable to apply a conservative factor to the wind turbine type maximum power level. For example, the wind turbine type maximum power level determined may be reduced by a predetermined amount, e.g.

1%, 2%, 5%, 10 KW, 25 KW, 50 KW, and so on, as the conservative factor. This conservative factor may be applied to ensure that the absolute wind turbine type maximum power level cannot be exceeded in any circumstances.

However, in the present embodiment such additional analysis is not performed nor is a conservative factor applied and the wind turbine type maximum power level is identified or determined as 1800 KW from the incremental test power level process described hereinabove.

The process of determining the wind turbine type maximum power level may then be performed for any further types of wind turbine that are to be analyzed.

In step 302 of FIG. 3, the design limitations for the electrical components in the type of wind turbine may be considered or evaluated for the previously determined wind turbine type maximum power level. As described hereinabove, the wind turbine type maximum power level for the type of wind turbine being analyzed in this embodiment was determined hereinabove as 1800 KW in relation to its mechanical components.

Therefore, in step 302, the main electrical components are considered to ensure that the determined wind turbine type maximum power level does not exceed the design limitations of the main electrical components of the type of wind turbine being analyzed. The main electrical components may include, for example, the generator, transformer, internal cables, contactors, or any other electrical component in the type of wind turbine.

Based on simulations and/or calculations it is then determined whether the main electrical components can operate at the previously determined wind turbine type maximum power level. For example, operation at the determined wind turbine type maximum power level may cause a temperature of one or more electrical cables inside the wind turbine to increase and so reduce the electrical current carrying capability of the electrical cables, which is determined by the size of cable conductor and the conditions for thermal dissipation. Therefore, the current carrying capacity would be calculated for the new temperature conditions in order to determine if the electrical cables are able to operate at power levels up to the wind turbine type maximum power level. Similar considerations may be taken into account for other electrical components, e.g. the temperature of the components, capacity of the components and so on, to identify whether the electrical components can operate at power levels up to the wind turbine type maximum power level.

If it is determined or identified that the main electrical components can operate at the previously determined wind turbine type maximum power level in relation to the mechanical components then, in step 303 of FIG. 3, for the given type of wind turbine then the wind turbine type maximum power level is set or recorded as the maximum power level for the given type of wind turbine.

However, if one or more the electrical components are unable to operate at the previously determined wind turbine type maximum power level then one or more of three options may be followed.

First, the calculations or simulations utilized to identify the one or more electrical components that are unable to operate at the previously determined wind turbine type maximum power level may be analyzed to identify whether any conservatism was incorporated into the calculations/simulations. Based on the analysis, it may be identified that the one or more electrical components may, in fact, be able to operate at the previously determined wind turbine type maximum power level due to the conservatism of the calculations/simulations used. If so, then in step 303 of FIG. 3, the maximum power level for the given type of wind turbine can be set at the previously determined wind turbine type maximum power level. For example, the electrical current that would result from the previously determined wind turbine type maximum power level may depend upon, at least in part, the voltage on the grid to which the WPP is connected. At some wind power sites the voltage on the grid may be less stable and vary more than at other wind sites. Where it can be determined that the voltage variation on a given individual wind site will be less than the variation for which the electrical components have been designed then the turbine may be allowed to operate at higher power.

Second, the design of the electrical components and/or mechanical components to which the electrical components may be associated, can be analyzed to identify whether a software control and/or hardware control solution may be implemented to enable the given type of wind turbine to operate at the previously determined wind turbine type maximum power level. For example, the control solution (in hardware and/or software) may allow the wind turbine to operate at the wind turbine type maximum power level for a period of time before preventing or cancelling the operation of the wind turbine at the wind turbine type maximum power level until it is able to do so again. An example of this may be that the calculations/simulations indicate that an electrical component, e.g. the generator terminal box, may overheat at the wind turbine type maximum power level. However, on analysis of that electrical component it may be identified that additional sensors, e.g. temperature sensors, could be implemented at or near to the electrical component such that the wind turbine operation can be controlled to cancel or prevent the operation at wind turbine type maximum power level if the temperature measurements from the temperature sensors is greater than a threshold. If the condition that may cause the calculation/simulation of the electrical components to fail can be solved or compensated for via software and/or hardware control then in step 303 of FIG. 3, the maximum power level for the given type of wind turbine may be set at or recorded as the previously determined wind turbine type maximum power level.

Third, if the calculations/simulations identify one or more electrical components as being unable to operate at the previously determined wind turbine type maximum power level and a solution to the failure for the one or more electrical components is not possible then a new wind turbine type maximum power level for the given wind turbine type may then be determined. For example, the previously determined wind turbine type maximum power level may be decremented by a predefined amount (e.g. 25 KW, 50 KW, 1%, 2%, and so on), and the calculations/simulations performed again on the electrical components. The calculations/simulations are performed at decrementing test power levels until a test power level is determined at which the design capabilities of the electrical components are not exceeded. The newly determined test power level may then, in step 303 of FIG. 3, be set or recorded as the wind turbine type maximum power level for that given type of wind turbine.

In this embodiment, it is determined from the analysis of the electrical components that, for the given type of wind turbine, the electrical components are able to operate at the previously determined wind turbine type maximum power level of 1800 KW. Thus, in step 303 of FIG. 3, the wind turbine type maximum power level for this type of wind turbine is set at or recorded as 1800 KW.

In the above described embodiments, the steps of identifying the wind turbine type maximum power level that the main mechanical components and the main electrical components of a given type of wind turbine are able to operate at are performed separately. However, as will be appreciated, the steps could be performed together, e.g. a combined mechanical component and electrical component analysis. In the above described embodiments the main mechanical components are analyzed prior to the main electrical components however, as will be appreciated, those steps are inter-changeable in order to determine the wind turbine type maximum power level for the given type of wind turbine.

The above described process may then be performed for further types of wind turbines, such that a wind turbine type maximum power level is determined and recorded for all different types of wind turbines.

Once the wind turbine type maximum power level has been determined for each type of wind turbine then this parameter may be utilized in order to determine or identify the maximum power level at which a wind turbine could be over-rated under certain conditions and at its location in a WPP. As described hereinabove, the wind turbine type maximum power level determined for a given type of wind turbine is the maximum power level that the type of wind turbine could be over-rated to, or able to operate at, without exceeding the ultimate design loads and/or limitations of the given type of wind turbine.

However, conditions at the WPP location or site may prevent the type of wind turbine being able to over-rate to the determined wind turbine type maximum power level. Or, the conditions facing some of the wind turbines at the WPP may prevent those wind turbines from being over-rated to the determined wind turbine type maximum power level for that type of wind turbine.

Therefore, it is preferable that an individual maximum power level e.g. the maximum over-rating power level, is determined for each wind turbine in a WPP, or a WPP maximum power level, e.g. the maximum over-rating power level, is determined for a WPP as a whole.

Individual maximum power levels for each wind turbine in a WPP are advantageous as the conditions in a WPP may vary across the site of the WPP. Therefore, it may be the case that a wind turbine in one location in the WPP may face different conditions to another wind turbine of the same type at a different location in the WPP. Accordingly, the two wind turbines of the same type may require different individual maximum power levels, or the lowest individual maximum power level may be applied to all wind turbines of that type in the WPP depending on the preferred implementation.

In this embodiment an individual wind turbine specific individual maximum power level will be determined. Accordingly, the WPP is analyzed in order to determine or identify the individual maximum power level for each wind turbine in the WPP, where the WPP may include one or more different types of wind turbine.

The analysis may be performed using a computer system that is online or offline in relation to the operation and control of the WPP. The tool to perform this analysis may be the same as or different to the system utilized to determine the wind turbine type maximum power level for each type of wind turbine, as described hereinabove. In the following example, an offline Site Check (SC) tool separate to the one used to determine the wind turbine type maximum power level is utilized to analyses the WPP and to determine the individual maximum power level for each wind turbine/the WPP.

Firstly, the SC tool is configured or set up in order to be able to determine an individual maximum power level for each wind turbine in a given WPP.

In step 304 of FIG. 3, the SC tool is populated with the previously determined wind turbine type maximum power level for each type of wind turbine and further populated with fatigue load values for a range of different power levels for each type of wind turbine in the WPP.

The fatigue load values may be calculated offline and may be calculated by the SC tool or by the offline system that determined the wind turbine type maximum power level for each type of wind turbine. In this embodiment, the offline system that determined the wind turbine type maximum power level calculates the fatigue load values for each type of wind turbine.

The range of power levels for which the fatigue load values are calculated is dependent on the type of wind turbine and its wind turbine type maximum power level, previously determined or identified. In the above described example, the type of wind turbine being analyzed had a nominal name-plate rating of 1650 KW and was determined as having a wind turbine type maximum power level of 1800 KW. Therefore, the range of power levels for which the fatigue load values are calculated may be from the nominal name-plate rating of 1650 KW to the wind turbine type maximum power level of 1800 KW. The range of power levels may therefore start at 1650 KW and increment in steps of 20 KW, 25 KW, 40 KW, 50 KW, and so on, or in percentage terms, e.g. 1%, 2%, 5%, and so on, up until the wind turbine type maximum power level for the given type of wind turbine is reached.

As will be appreciated, different types of wind turbine will have different nominal name-plate ratings and different determined wind turbine type maximum power levels.

It may also be useful to consider the fatigue load values for de-rated power levels of the type of wind turbine or for each individual wind turbine. For example, in this case where the type of wind turbine has a nominal plate rating of 1650 KW then the range of power levels for which fatigue load values are calculated may instead start at, for example, 1400 KW up to the wind turbine type maximum power level in order to include the de-rated power levels for the wind turbine.

The advantage of including de-rated power levels is that, on average, a higher individual maximum power level can be achieved, because the expected or actual de-rating of the wind turbine will provide more spare fatigue capacity in the components.

The fatigue-load values are used for the whole spectrum of operating conditions and power level ranges, since the fatigue damage accumulates in all operating conditions and power levels, but at different rates. Accordingly it may be beneficial to utilize in the calculation the expected or actual time that a wind turbine may spend at each power-level of operation, including both over-rated and non-over-rated power levels, to determine the amount of fatigue and/or damage to the components of the wind turbine.

However, in this embodiment the fatigue load values will only be calculated for each type of wind turbine from nominal name-plate rating up to the determined wind turbine type maximum power level.

The offline system determines the fatigue load values for each power level in the range by running or simulating load cases across a range of wind speeds (e.g. 4 m/s to 20 m/s) of 5 or 10 minute durations. Accordingly, a significant number of fatigue load levels for each power level in the range of power levels are calculated and generated. Simulating the load cases may also include extrapolation or any other analysis that could be performed in order to calculate or generate the fatigue load levels.

Additionally, the offline system may also calculate fatigue load values based on one or more ranges of other variables, such as wind-speed, turbulence, air density, and so on.

The SC tool is populated with at least the calculated fatigue load values relevant to the type or types of wind turbines in a given WPP that is being analyzed.

In step 305 of FIG. 3, the SC tool is further populated with information or parameters relating to the given WPP site topography, terrain, wind conditions, and so on. The topography and terrain information may be provided by site surveys and/or from knowledge of the WPP site, which may include details of slopes, cliffs, inflow angles to each turbine in the WPP, and so on. Wind conditions, e.g. wind-speeds (seasonal, annual, etc.), turbulence intensity (seasonal, annual, etc.), air density (seasonal, annual, etc.), temperature (seasonal, annual, etc.), and so on, may be provided from Met Mast data and/or from wind conditions experienced and logged by the wind turbines and/or WPPC in location at the WPP.

The SC tool may comprise one or more memory, database, or other data structure, to store and maintain the fatigue load values for each type of wind turbine, wind turbine type maximum power levels for each type of wind turbine, and information and/or parameters relating to the WPP site conditions.

Once the SC tool has been populated with the relevant data then the over-rating power level for each wind turbine can be determined.

In step 306 of FIG. 3, it may be identified whether the process for determining the Wind Turbine specific individual maximum power level (or WPP specific) over-rating power level is being applied to an existing WPP (e.g. as a retrofit) or is being applied to a new, or recently installed WPP.

In the case that the determination of Wind Turbine specific individual maximum power level (e.g. the maximum possible over-rating power level for the individual wind turbine) is being applied to an existing WPP that has been in operation for a period of time (e.g. one year or more) then the method may move to step 307 of FIG. 3. Alternatively, any historical operation of the WPP and/or the Wind Turbines could be ignored and the existing WPP effectively be considered a new WPP for the purpose of determining the individual maximum power level for each specific Wind Turbine/the WPP. In this case, the process would proceed to step 308 of FIG. 3.

In the case that the determination of Wind Turbine specific individual maximum power level is being applied to a new WPP or a WPP that has been in operation for a short period of time (e.g. less than one year) then the method of the embodiments moves to step 308 of FIG. 3.

Returning to step 307, in the case that the process is being applied to an existing WPP, the SC tool may be further populated with historical information or data relating to the WPP's operation and/or each wind turbine's operation to-date. The historical data may include, for example, the number of years operation to date, the operating levels of the wind turbines, temperatures and other conditions measured in the turbine that could potentially cause the control system to limit the over-rating if such conditions were to occur in future operation, and so on.

By utilizing existing or historical data on the operation of the WPP and/or for each of the wind turbines then a more effective individual maximum power level can be determined. For example, if the historical operational data shows that the wind conditions have been below the design regime for the wind turbine(s) then there could effectively be additional "spare capacity" in component fatigue. In other words, if the WPP has seen lower wind speeds than expected then the wind turbines will not have been operated to their fullest capacity and as such will not have been subject to as much component fatigue as expected and therefore could permit a higher level of over-rating to be achieved. Similarly, if the WPP has seen greater wind speeds than expected then the level of over-rating could be reduced to ensure that the wind turbine components reach their expected lifetime (typically 20 years).

The historical data relating to the operation of the WPP and/or Wind Turbines in the WPP may be used to alter or correct the fatigue load values calculated in the previous step, so that the historical operation data is taken into account when determining the over-rating power level for each specific Wind Turbine.

For example it may be necessary to limit the over-rating on hot days when critical temperatures approach their operating limits even though high wind conditions would otherwise allow more power to be generated. The historical data will allow the duration of such periods to be estimated and used to correct the wind-based predictions of how much over-rated operation is likely to occur in future. By taking into account periods of restriction on over-rating that arise from conditions other than the availability of suitable wind conditions a lower estimate of future fatigue load will result than would otherwise be calculated thus enabling a higher upper-limit on over-rated power, and therefore individual maximum power level to be calculated.

The process may then continue to step 308 of FIG. 3 in order to determine the specific individual maximum power levels for each wind turbine in the WPP.

In step 308 of FIG. 3, the Wind Turbine specific individual maximum power levels can be determined by the SC tool based on, at least some, of the information and data the SC tool has been populated with in the preceding steps described hereinabove.

The SC tool may consider each Wind Turbine in turn, may consider all Wind Turbines in the WPP of each type of Wind Turbine in turn, or may consider all Wind Turbines of all types in the WPP together in order to determine the wind turbine specific individual maximum power level for each Wind Turbine in the WPP.

In this embodiment, the SC tool will consider all Wind Turbines in the WPP of the same type in turn.

As described hereinabove, the SC tool is populated with the wind turbine type maximum power level for each type of wind turbine, fatigue load values for each type of wind turbine for at least a range of power levels (which may or may not have been corrected or altered by historical operational data if the WPP has been in operation for one year or more), and the WPP site conditions (which may include the terrain and conditions that may affect each wind turbine in the WPP).

In the examples given hereinabove, one type of wind turbine was considered and the maximum power level was determined as 1800 KW. Therefore, in this example the SC tool may determine a wind turbine specific individual maximum power level for each of the wind turbines of this type.

The SC tool may start at the wind turbine type maximum power level for the type of wind turbine, e.g. 1800 KW in this example, and check the fatigue load values for each turbine based on one or more of the conditions faced by each of the wind turbines at their specific location or position in the WPP.

If a specific Wind Turbine of the given type of wind turbine is able to operate at 1800 KW, based on the fatigue load values determined for the 1800 KW power level and given the site conditions facing that Wind Turbine (e.g. expected wind conditions, terrain conditions, etc.) then the individual maximum power level for over-rating of that particular Wind Turbine can be set at 1800 KW.

All the Wind Turbines of the given type are checked in relation to whether they are able to operate at 1800 KW at their location in the WPP. All the Wind Turbines that are able to operate at 1800 KW are recorded or marked as having an individual maximum power level of 1800 KW.

If there are Wind Turbines of the given type of wind turbine that are not able to operate at 1800 KW, due to the site conditions at their location in the WPP, then the SC tool checks to see which of the remaining wind turbines of the given type are able to operate at a lower or decremented power level. The amount that the power level is decremented relates to the power level range for which the fatigue load levels were previously calculated. In this example, the SC tool will check whether the remaining wind turbines of the given type are able to operate at 1780 KW.

Therefore, for each of the remaining wind turbines or the given type of wind turbine it is checked whether each specific wind turbine, based on the fatigue load levels for 1780 KW and the site conditions expected for each of the remaining wind turbines, it is determined or identified which of the remaining wind turbines are able to operate at an over-rating power level of 1780 KW. Those wind turbines that are able to operate at 1780 KW are then recorded or marked as having an individual maximum power level of 1780 KW.

The process is iteratively repeated for all subsequent decremented power levels until an individual maximum power level is identified or recorded for all wind turbines of the given type in the WPP.

The same process is then repeated for all other types of wind turbine that are present in the WPP so that an individual maximum power level is identified or recorded for all wind turbines present in the WPP.

Accordingly, at the end of step 308 of FIG. 3, an individual maximum power level that is wind turbine specific will have been identified or recorded for all wind turbines present in the WPP.

In the above example, the process determined an individual maximum power level for each wind turbine of a given type by identifying which wind turbines are able to operate at the wind turbine type maximum power level determined previously and then subsequently decrementing the power level until all wind turbines of the given type had an individual maximum power level.

Alternatively, the process could have started at the nominal name-plate rating power level and increment the power levels until an individual maximum power level for each individual wind turbine is identified and recorded.

As a further alternative, a single WPP maximum power level could have been identified as the lowest individual maximum power level for any one wind turbine, either using an incrementing or decrementing power level process.

It has been identified that even if the wind turbine is able to operate at a particular determined individual maximum power level there may be other limitations, for example, due to external cabling, grid requirements, operator requirements, customer requirements, and so on. Therefore, in step 309 of FIG. 3, it may be checked whether any other limitations that may prevent the wind turbine from operating at its determined individual maximum power level exist.

If any additional limitations exist which may affect the individual maximum power level for one or more wind turbines in the WPP then the individual maximum power level for those wind turbines may be adjusted accordingly.

In step 310 of FIG. 3, each wind turbine is set at its individual maximum power level. The WPPC may inform or set the individual maximum power levels in each individual wind turbine or any other system may communicate the individual maximum power levels to each of the wind turbines in the WPP.

As an alternative, in step 311 of FIG. 3, a single WPP maximum power level for the WPP or one maximum power level for a given type of wind turbine (e.g. the lowest individual maximum power level identified for the WPP or the lowest individual maximum power level identified for a given type of wind turbine in the WPP) is used and each wind turbine is set at the appropriate individual maximum power level.

Accordingly, each wind turbine is then able to operate at one or more power levels up to its individually set individual maximum power level.

Accordingly, the embodiments described hereinabove advantageously enables an individual maximum power level to be determined for and set in the control system of each individual wind turbine in a WPP. The individual maximum power level determination may take into consideration the determined wind turbine type maximum power level along with one or more of various factors and conditions that may affect, or have affected, the individual wind turbines, for example, the wind conditions at the WPP site, the terrain conditions and topography, and so on. This ensures a more efficient and effective ability to control the over-rating of the individual wind turbines and ensure the most efficient Annual Energy Production (AEP) for each WPP.

In the above embodiments and examples, a single individual maximum power level was determined for each wind turbine in a WPP. Alternatively or additionally, individual wind sector maximum power levels may be determined for over-rating control for different wind-direction sectors for each wind turbine. Typically, the 360 degree horizon of a wind turbine is divided into 12 sectors, each of 30 degrees, and therefore an individual sector maximum power level may be determined for each of the 12 sectors for each of the wind turbines. This may provide a greater AEP as one sector may be a low turbulence sector and as such may have a greater scope for over-rating and thus a greater individual first sector maximum power level than one or more other sectors. Similarly a high turbulence sector may have a lower scope for over-rating and thus a lower individual second sector power level than one or more other sectors.

In order to determine the individual wind sector maximum power level for over-rating control in each sector for each wind turbine then step 308 of FIG. 3 may further include determining the individual sector maximum power level for each sector based on the wind and/or site conditions corresponding or relating to each sector of each wind turbine in the WPP. For example, in step 308 instead of determining an individual maximum power level for a specific wind turbine of a given type, the process may determine an individual sector maximum power level for each sector of each wind turbine based on the fatigue load levels and the wind/site conditions in each sector. In order to enable a sector based over-rating power level then the SC tool may be further populated with sector based data for each wind turbine. Alternatively, or additionally, an optimization algorithm could adjust the maximum power levels in each sector, with the aim being the highest possible estimated AEP from the turbine, subject to a constraint that wind turbine lifetime must not be less than design life.

In the above examples and embodiments, the different maximum power levels for over-rating control were determined and subsequently used to control the operation of each individual wind turbine. However, alternatively or additionally the maximum powers levels (for type of wind turbine and/or individual wind turbine) may, in one or more of the embodiments or in alternative embodiments, include, indicate or define one or more of a maximum rotor speed, a maximum generator speed, a maximum generator torque, and a maximum generator current demand. For example, one or more of a maximum rotor speed, a maximum generator speed, a maximum generator torque, and a maximum generator current demand may be determined for each type of wind turbine and then subsequently one or more of a maximum rotor speed, a maximum generator speed, a maximum generator torque, and a maximum generator current demand could be determined for each wind turbine of that type of wind turbine and use to control the operation of the over-rating in each wind turbine in the WPP. The process would be very similar to that described hereinabove in relation to the determination of the over-rating maximum power levels.

For example, an optimization algorithm could be used to determine the values of maximum rotor speed and/or the maximum generator current for a given turbine that would give the maximum AEP subject to the turbine lifetime not being less than the design lifetime.

The above described embodiments are not exclusive and one or more of the features can be combined or cooperate in order to achieve the improved over-rating control via setting maximum power levels for each wind turbine in a Wind Power Plant that takes into account the environmental and site conditions facing or affecting the wind turbine.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method for setting a maximum power level for a wind turbine type, the method comprising:
    simulating a load spectrum for two or more test power levels, wherein a load on the wind turbine type is determined for each test power level of the two or more test power levels, wherein simulating the load spectrum comprises:
        setting an initial test power level of the two or more test power levels, wherein the initial test power level is greater than a nominal name-plate power level for the wind turbine type by a first predetermined value; and
        performing one of incrementing and decrementing each subsequent test power level of the two or more test power levels by a second predetermined value;
    comparing the load on the wind turbine type for each test power level with a design load for the wind turbine type; and
    setting the maximum power level for the wind turbine type as a maximum test power level at which the load on the wind turbine type does not exceed the design load.

2. The method as claimed in claim 1, wherein the load on the wind turbine type includes a load for one or more mechanical components of the wind turbine type.

3. The method as claimed in claim 2, further comprising:
    determining, for at least a first test power level of the two or more test power levels, that the load on the wind turbine type exceeds the design load;
    identifying at least a first mechanical component of the one or more mechanical components for which the load exceeds a design load of the first mechanical component; and
    analyzing the first mechanical component to identify whether the design load for the first mechanical component can be increased.

4. The method as claimed in claim 2, further comprising:
    determining, for at least a first test power level of the two or more test power levels, that the load on the wind turbine type exceeds the design load;
    identifying at least a first mechanical component of the one or more mechanical components for which the load exceeds a design load of the first mechanical component;
    identifying control and/or hardware available in the wind turbine type that enables the first mechanical component to operate at a load greater than the design load for the first mechanical component; and
    implementing the control and/or hardware in the wind turbine type.

5. The method as claimed in claim 1, wherein simulating the load spectrum for the two or more test power levels is performed either simultaneously or sequentially for each of the two or more test power levels.

6. The method as claimed in claim 1, comparing the load on the wind turbine type for each test power level with the design load for the wind turbine type is performed either simultaneously or sequentially for each of the two or more test power levels.

7. The method as claimed in claim 1, further comprising:
    determining, for the maximum power level, whether one or more electrical components of the wind turbine type are within one or more design limits.

8. The method as claimed in claim 7, further comprising:
    determining that at least a first electrical component of the one or more electrical components is outside the one or more design limits;
    determining whether the one or more design limits reflect a conservatism factor; and
    increasing at least a first design limit of the one or more design limits,
    wherein the first electrical component is within the increased first design limit.

9. The method as claimed in claim 7, further comprising:
    determining that at least a first electrical component of the one or more electrical components is outside the one or more design limits;
    identifying control and/or hardware available in the wind turbine type that enables the first electrical component to operate within one or more increased design limits; and
    implementing the control and/or hardware in the wind turbine type.

10. The method as claimed in claim 7, further comprising:
    determining that at least a first electrical component of the one or more electrical components is outside the one or more design limits;
    decrementing the maximum power level by a third predetermined value;

determining, for the decremented maximum power level, whether the first electrical component is within the one or more design limits; and setting the maximum power level at the decremented maximum power level when the first electrical component is within the one or more design limits.

11. The method as claimed in claim 1, further comprising:
determining an individual maximum power level for one or more wind turbines of the wind turbine type based on the maximum power level; and
performing over-rating control of the one or more wind turbines according to the individual maximum power level.

12. The method as claimed in claim 1, wherein the maximum power level is a first maximum power level for a first wind turbine type, the method further comprising:
setting a second maximum power level for a second wind turbine type.

13. The method as claimed in claim 1, further comprising:
applying a conservatism factor to the maximum power level.

14. The method as claimed in claim 1, further comprises:
setting, based on the maximum power level, one or more of a maximum generator torque, a maximum generator current, a maximum generator speed, and a maximum rotor speed for at least a first wind turbine of the wind turbine type.

15. The method of claim 1, further comprising:
based on the comparison, identifying two adjacent test power levels comprising:
a first test power level of the two or more test power levels at which the load on the wind turbine type does not exceed the design load; and
a second test power level of the two or more test power levels at which the load on the wind turbine type exceeds the design load; and
simulating a load spectrum for one or more additional test power levels occurring between the first test power level and the second test power level.

16. The method of claim 15, wherein simulating the load spectrum for the one or more additional test power levels comprises:
performing one of incrementing and decrementing each additional test power level of the one or more additional test power levels by a third predetermined value that is less than the second predetermined value.

17. An apparatus for setting a maximum power level for a wind turbine type, the apparatus comprising:
one or more computer processors configured to:
simulate a load spectrum for two or more test power levels, wherein a load on the wind turbine type is determined for each test power level of the two or more test power levels, wherein simulating the load spectrum comprises:
setting an initial test power level of the two or more test power levels, wherein the initial test power level is greater than a nominal name-plate power level for the wind turbine type by a first predetermined value; and
performing one of incrementing and decrementing each subsequent test power level of the two or more test power levels by a second predetermined value;
compare the load on the wind turbine type for each test power level with a design load for the wind turbine type; and
set the maximum power level for the wind turbine type as a maximum test power level at which the load on the wind turbine type does not exceed the design load.

18. The apparatus as claimed in claim 17, wherein the one or more computer processors are further configured to:
determine a load for one or more mechanical components of the wind turbine type.

19. The apparatus of claim 17, wherein the one or more computer processors are further configured to:
based on the comparison, identify two adjacent test power levels comprising:
a first test power level of the two or more test power levels at which the load on the wind turbine type does not exceed the design load; and
a second test power level of the two or more test power levels at which the load on the wind turbine type exceeds the design load; and
simulate a load spectrum for one or more additional test power levels occurring between the first test power level and the second test power level.

20. The apparatus of claim 19, wherein simulating the load spectrum for the one or more additional test power levels comprises:
performing one of incrementing and decrementing each additional test power level of the one or more additional test power levels by a third predetermined value that is less than the second predetermined value.

* * * * *